(12) United States Patent
Prociw et al.

(10) Patent No.: US 11,885,496 B2
(45) Date of Patent: Jan. 30, 2024

(54) FLUID DISTRIBUTORS FOR FLUID NOZZLES

(71) Applicant: Delavan Inc., West Des Moines, IA (US)

(72) Inventors: Lev A. Prociw, Johnston, IA (US); Jason Ryon, Carlisle, IA (US); Philip E. O. Buelow, West Des Moines, IA (US)

(73) Assignee: Collins Engine Nozzles, Inc., Des Moines, IA (US)

(*) Notice: Subject to any disclaimer, the term of this patent is extended or adjusted under 35 U.S.C. 154(b) by 273 days.

(21) Appl. No.: 17/243,246

(22) Filed: Apr. 28, 2021

(65) Prior Publication Data

US 2021/0332981 A1 Oct. 28, 2021

Related U.S. Application Data

(60) Provisional application No. 63/016,711, filed on Apr. 28, 2020.

(51) Int. Cl.
*F23R 3/28* (2006.01)
*F02C 7/22* (2006.01)
(Continued)

(52) U.S. Cl.
CPC .............. *F23R 3/28* (2013.01); *F02C 7/22* (2013.01); *F23D 3/40* (2013.01); *F05D 2240/36* (2013.01);
(Continued)

(58) Field of Classification Search
CPC .. F23R 3/14; F23R 3/286; F23R 3/346; F23R 3/28; F23D 11/383; F23D 3/40; F02C 7/22; F05D 2240/36
See application file for complete search history.

(56) References Cited

U.S. PATENT DOCUMENTS 3,691,764 A 9/1972 Ware
4,478,045 A * 10/1984 Shekleton ................ F23R 3/38
60/737
(Continued)

FOREIGN PATENT DOCUMENTS

JP 2020051665 A 4/2020
KR 101689930 B1 12/2016

OTHER PUBLICATIONS

Extended European Search Report for European Patent Application No. EP21170612.2, dated Oct. 4, 2021.

*Primary Examiner* — Gonzalo Laguarda
(74) *Attorney, Agent, or Firm* — Locke Lord LLP; Joshua L. Jones; Gabriella D'angelo

(57) ABSTRACT

A fluid nozzle includes a first fluid circuit, a second fluid circuit spaced apart from the first fluid circuit and a fuel circuit. The fuel circuit is defined between the first and second fluid circuits and between a first fuel circuit wall and a second fuel circuit wall. A ring-shaped permeable barrier is positioned between the first and second fuel circuit walls configured and adapted to provide a controlled resistance to fuel flow. A fuel distributor includes a first fuel circuit wall and a second fuel circuit wall spaced apart from the first fuel circuit wall. A fuel circuit is defined between the first and second fuel circuit walls. A ring-shaped permeable barrier is positioned between first and second fuel circuit walls. A combustion assembly includes a combustor housing, a combustor dome positioned at an upstream end of the combustor housing, and a fluid nozzle positioned adjacent the combustor dome.

20 Claims, 4 Drawing Sheets

(51) Int. Cl.
  *F23D 3/40*   (2006.01)
  *F23R 3/14*   (2006.01)
  *F23D 11/38*  (2006.01)

(52) U.S. Cl.
  CPC .............. *F23D 11/383* (2013.01); *F23R 3/14* (2013.01); *F23R 3/286* (2013.01)

(56) References Cited

U.S. PATENT DOCUMENTS

| | | | |
|---|---|---|---|
| 5,438,834 A | 8/1995 | Vuillamy et al. | |
| 6,457,458 B1 * | 10/2002 | Frank .................... | F02M 37/08 |
| | | | 123/509 |
| 9,897,321 B2 * | 2/2018 | Prociw .................... | F23R 3/286 |
| 10,344,981 B2 * | 7/2019 | Prociw ..................... | F23R 3/14 |
| 10,385,809 B2 * | 8/2019 | Prociw ..................... | F02C 7/22 |
| 10,527,286 B2 * | 1/2020 | Prociw ..................... | F02C 7/22 |
| 10,634,355 B2 * | 4/2020 | Prociw .................... | F23R 3/346 |
| 11,280,495 B2 * | 3/2022 | Gandikota ............. | F23R 3/286 |
| 2013/0192243 A1 | 8/2013 | Boespflug et al. | |
| 2017/0009995 A1 * | 1/2017 | Witham ................ | F23D 11/383 |
| 2018/0080384 A1 | 3/2018 | Prociw et al. | |

* cited by examiner

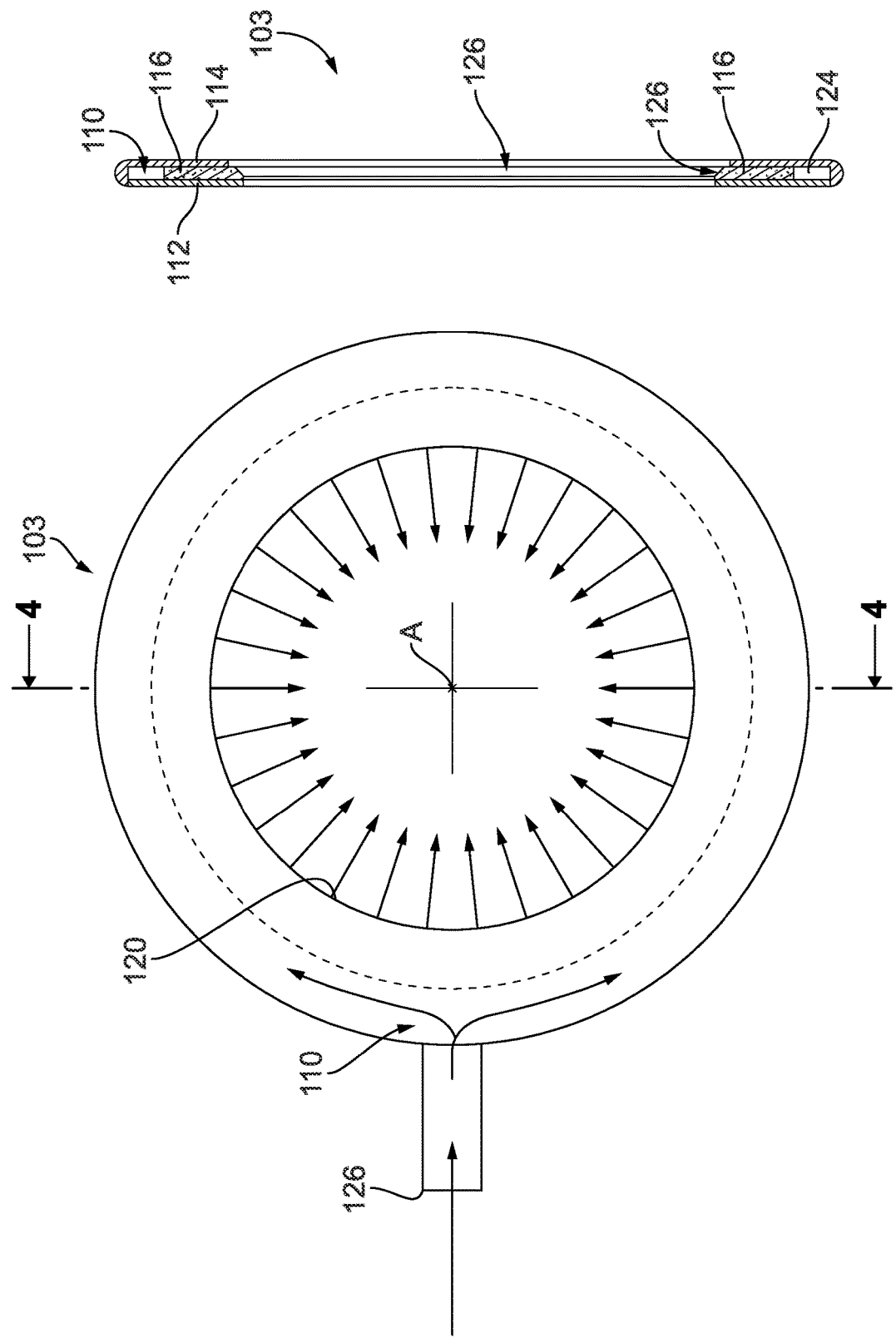

FLUID DISTRIBUTORS FOR FLUID NOZZLES

CROSS-REFERENCE TO RELATED APPLICATIONS

This application claims priority to and the benefit of U.S. Provisional Application No. 63/016,711, filed Apr. 28, 2020, the entire contents of which are herein incorporated by reference in their entirety.

BACKGROUND

1. Field

The present disclosure relates to air blast nozzles, and more particularly to fluid distributors for air blast nozzles in gas turbine engines operating at low flow rates.

2. Description of Related Art

Gas turbine engines often use fluid nozzles, such as air-blast nozzles, with small features at high pressures in order to generate a liquid spray of fuel at low flow rates (e.g. when at low power). These nozzles generally have a high pressure spin chamber to produce a hollow liquid-fuel cone with high inertia which subsequently disintegrates into a spray upon encountering air in the combustor. Generally, the flow path geometry is conical which suits can-style combustors but does not necessarily suit annular combustors.

Spinning fuel requires fluid nozzles with small features which can be prone to durability issues. Fuel also generally needs to travel a significant distance from the small injection orifice to get to the target zone where the air is available, which may cause evaporation in transit thereby making it more difficult to achieve certain mixtures. The pressure required for a given fluid nozzle varies as the square of the flow rate, meaning that pressures at high flows can be too high, while pressure at low flow can be too low.

A larger fluid nozzle with larger fuel injection annulus would provide improved performance at low flow rates, among other things. One challenge in using larger fluid nozzles, however, is that they may not provide the desired fuel distribution about the annulus at low fluid flow rates due to gravity.

The conventional techniques have been considered satisfactory for their intended purpose. However, there is an ever present need for improved systems and methods for using larger fluid nozzles. This disclosure provides a solution for this need.

SUMMARY

A fluid nozzle includes a first fluid circuit, a second fluid circuit spaced apart from the first fluid circuit and a fuel circuit. The fuel circuit is defined between the first and second fluid circuits and between a first fuel circuit wall and a second fuel circuit wall. A ring-shaped permeable barrier is positioned between the first and second fuel circuit walls configured and adapted to provide a controlled resistance to fuel flow.

In some embodiments, the ring-shaped permeable barrier includes a sintered metal distributor body. The ring-shaped permeable barrier can have an outer diameter inlet and an inner diameter outlet. The inner diameter outlet can include a beveled surface. The ring-shaped permeable barrier can be produced by additive manufacturing. The first fluid circuit can be defined between a first annular swirler shell and second annular swirler shell. The first fluid circuit and/or the second fluid circuit can be a swirling air circuit. The first fluid circuit and/or the second fluid circuit can be a non-swirling air circuit. A fuel inlet can be in fluid communication with the fuel circuit.

In accordance with another aspect, a fuel distributor includes a first fuel circuit wall and a second fuel circuit wall spaced apart from the first fuel circuit wall. A fuel circuit is defined between the first and second fuel circuit walls. A ring-shaped permeable barrier is positioned between the first and second fuel circuit walls configured and adapted to provide a controlled resistance to fuel flow in the fuel circuit.

The ring-shaped permeable barrier can be similar to that described above. The fuel distributor can include a fuel inlet in fluid communication with the fuel circuit.

In accordance with another aspect, a combustion assembly includes a combustor housing, a combustor dome positioned at an upstream end of the combustor housing, and a fluid nozzle positioned adjacent to the combustor dome. The fluid nozzle can be similar to that described above where the fluid circuit is a fuel circuit. The ring-shaped permeable barrier can be similar to that described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a schematic front elevation view of a portion of the fluid nozzle of FIG. 1, showing a fuel distributor;

FIG. 4 is a schematic cross-sectional side elevation view of a portion of the fuel distributor FIG. 3, showing the sintered permeable metallic flow distributor body;

DETAILED DESCRIPTION OF THE PREFERRED EMBODIMENTS

Figure 1:
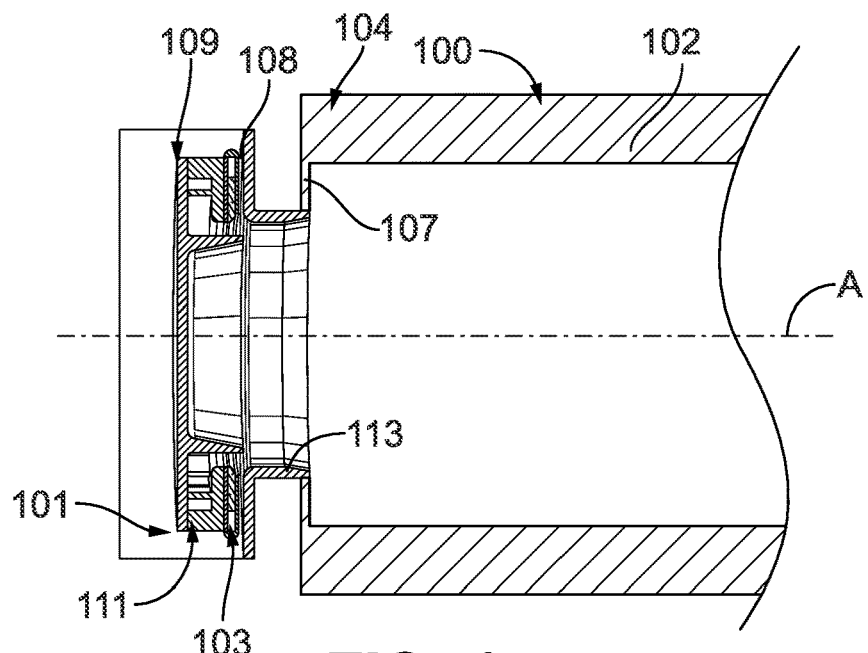
FIG. 1 is a schematic cross-sectional side elevation view of an embodiment of a combustion assembly constructed in accordance with the present disclosure, showing the combustion dome and the fluid nozzle.

Reference will now be made to the drawings wherein like reference numerals identify similar structural features or aspects of the subject disclosure. For purposes of explanation and illustration, and not limitation, a partial view of an embodiment of a combustion system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used for providing a means of mixing air and fuel with much lower pressure fuel flow requirements by using a larger fluid nozzle with improved fluid distribution about its annulus.

Figure 2:
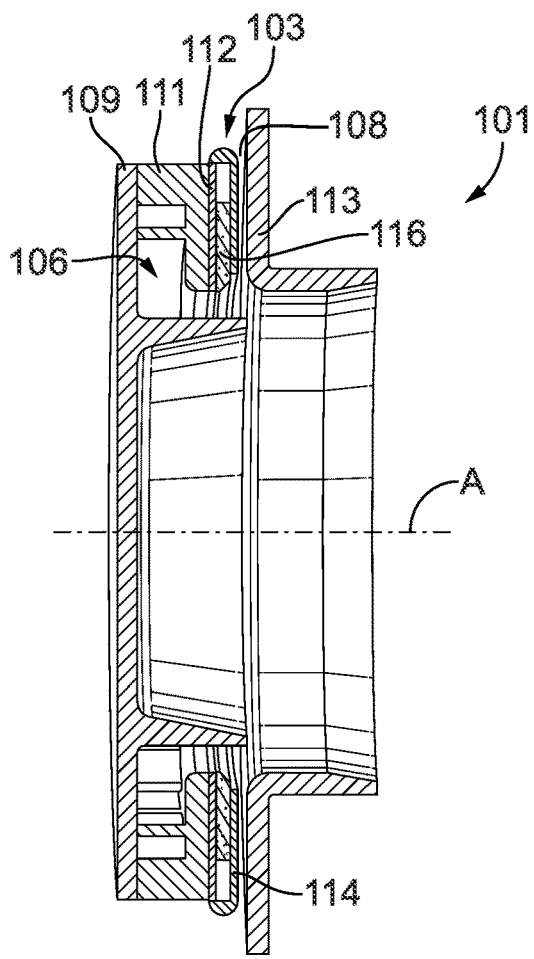
FIG. 2 is a schematic cross-sectional side elevation view of the fluid nozzle of FIG. 1, showing inner and outer air circuits and the fuel circuit therebetween.

As shown in FIGS. 1-2, a combustion assembly 100 includes a combustor housing 102, a combustor dome 104 positioned at an upstream end of the combustor housing 102, and a fluid nozzle 101 positioned adjacent the combustor dome 104. Combustion assembly 100 defines a longitudinal axis A. Fluid nozzle 101 includes a first fluid circuit 106, e.g. an inner air circuit, a second fluid circuit 108, e.g. an outer air circuit, spaced apart from the inner fluid circuit 106. A fuel distributor 103 is defined between the inner and outer fluid circuits 106 and 108, respectively, in a radial direction relative to longitudinal axis A. Inner fluid circuit 106 is defined in a space in an axial direction between a first annular swirler shell 109 and second annular swirler shell 111. Inner fluid circuit 106 is a swirling air circuit. Outer fluid circuit 108 is a non-swirling air circuit.

With traditional fluid nozzles, in order to generate a liquid spray, the liquid typically first forms a thin, conical sheet that disintegrates into droplets once it enters the adjacent air. With traditional fuel nozzles, this means that to form an ignitable mixture at low fuel flows, the slots and exit orifice must be very small in order to generate sufficient pressure. As the flow-rate increases, the pressure drop required to inject the fuel increases as the square of the flow-rate. So if the flow-rate increases by 50 times, the pressure would rise by a factor of 2500. As such, with traditional smaller fluid nozzles, in order to limit the maximum pressure during high flow-rates, the nozzle must reduce its pressure at low flow, which can cause performance issues at low power.

With reference now to FIGS. 3-4, fuel distributor 103 includes a first fuel circuit wall 112 and a second fuel circuit wall 114 spaced apart from the first fuel circuit wall 112 in an axial direction, e.g. the direction defined by longitudinal axis A. The fuel circuit walls 112 and 114 are metallic. An annular fuel circuit 110 is defined in the space between first and second fuel circuit walls 112 and 114, respectively. Fuel circuit 110 includes an annular distribution channel 124 and permeable barrier 116.

As shown in FIG. 3, fuel distributor 103 includes a fuel inlet 126 in fluid communication with fuel circuit 110. Fuel circuit 110, e.g. a liquid or gas circuit, is defined between the inner and outer air circuits 106 and 108, respectively, and is generally annular in shape. Fuel enters through inlet 126 and flows through the distribution channel 124 and through permeable barrier 116. Fuel distributor 103 defines an annular distributed fuel outlet 120 in fluid communication with the fuel circuit 110. The direction of fuel at the outlet 120 is indicated schematically by the radially pointing arrows. When the exiting fuel meets with the air from air circuits 106 and 108, the fuel is atomized and generates a fuel-air mixture suitable for combustion. Outer fluid circuit 108 is defined in a space in an axial direction between an outer shell 113 and second fuel circuit wall 114. Outer shell 113 is connected to combustor dome 104 by way of spacer 107. Outer shell 113 and combustor dome 104 are both components of combustor housing 102. The combustor housing 102 could also be used without outer shell 113. In that case, outer fluid circuit 108 would be defined between the second fuel circuit wall 114 and the combustor dome 104.

Figure 5:
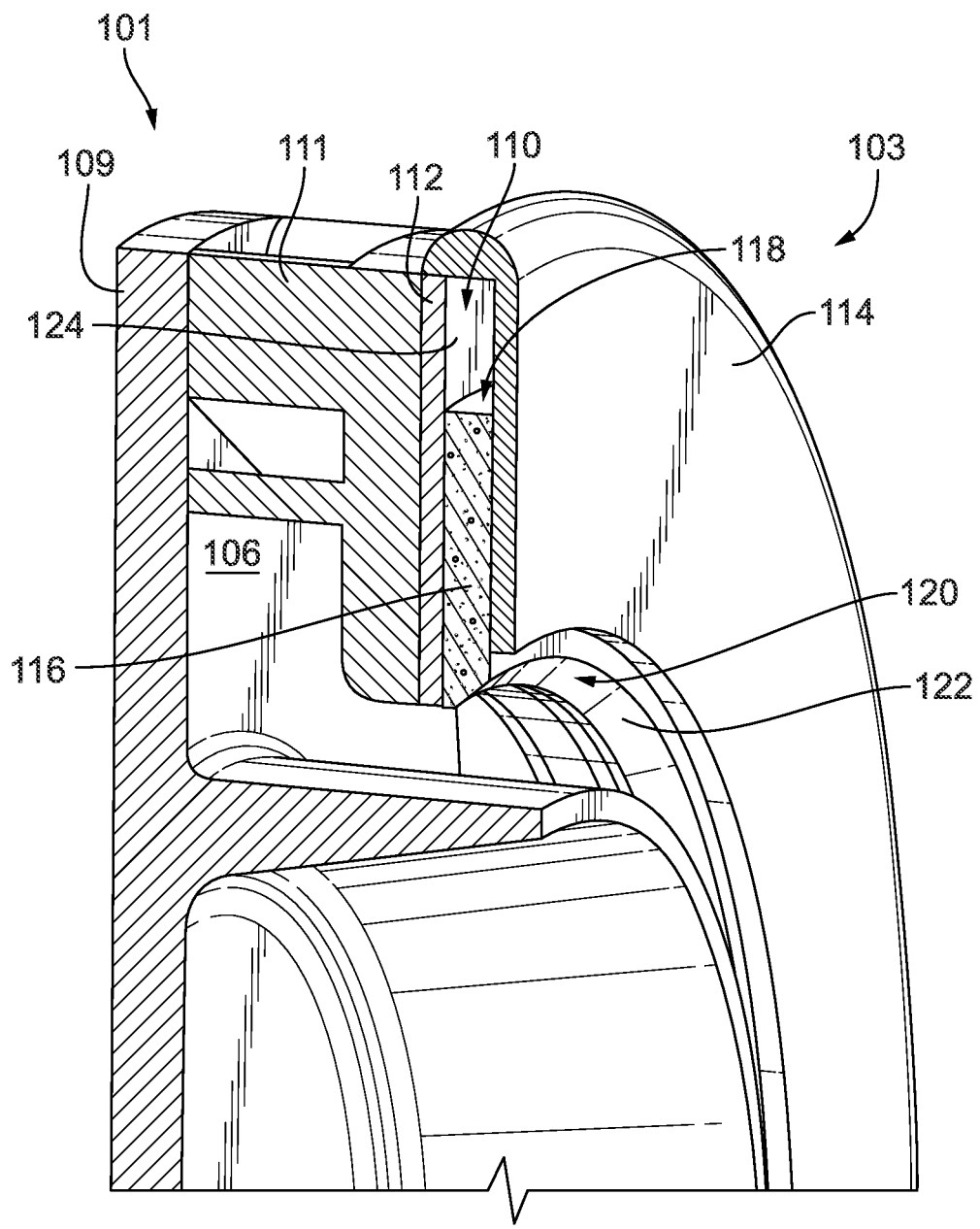
FIG. 5 is a schematic cross-sectional perspective view of a portion of the fluid nozzle of FIG. 1, showing the sintered permeable metallic flow distributor body.
Figure 6:
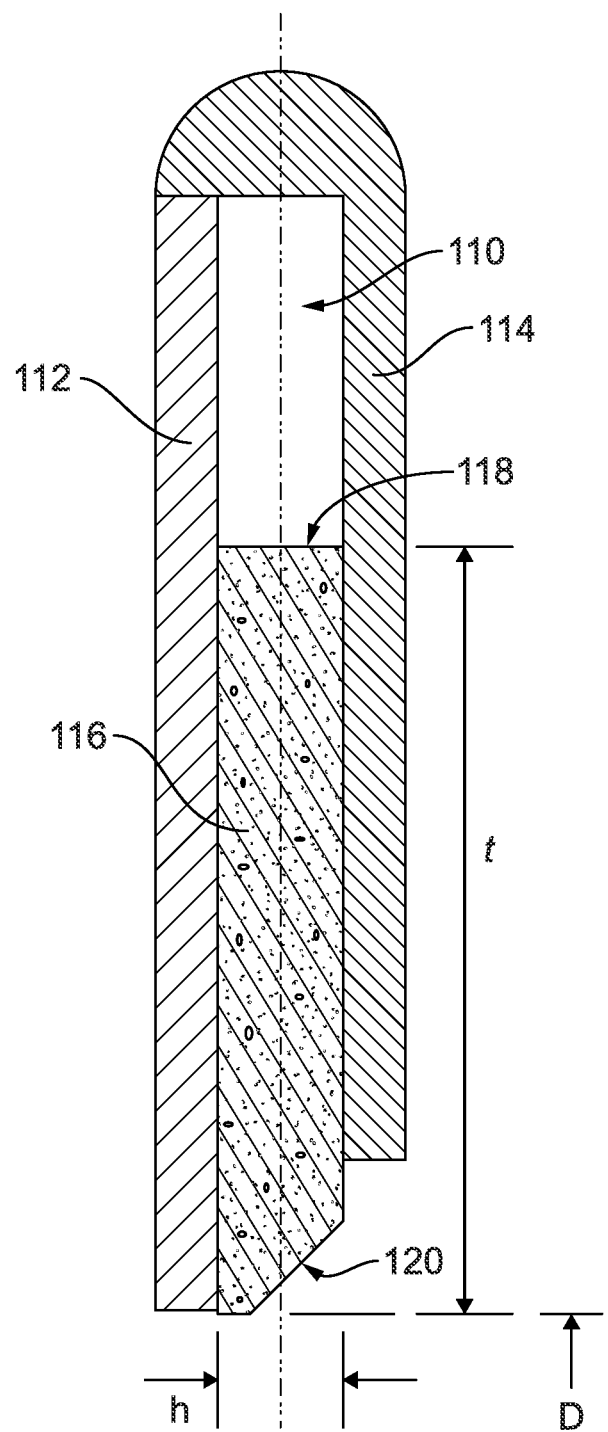
FIG. 6 is a schematic cross-sectional side elevation view of a portion of the fuel distributor of FIG. 1, showing the sintered permeable metallic flow distributor body.

As shown in FIGS. 5-6, fluid nozzle 101 includes a fuel distributor 103 with a larger diameter annulus as compared with traditional spin-style fuel distributors. Fluid nozzle 101 processes the fuel and air together within the nozzle 101 in a more intensive manner to produce more flammable mixtures, resulting in improved combustion performance. The larger diameter allows fluid nozzle 101 to handle more air. In order to ensure that the liquid or gas, e.g. liquid fuel, is distributed evenly about the larger diameter of the fuel distributor to avoid pooling due to gravity, a ring-shaped, e.g. toroidal, annular, or the like, permeable barrier 116 is positioned between the first and second fuel circuit walls 112 and 114, respectively. The permeable barrier 116 is rigidly attached to the impervious adjacent first and second fuel circuit walls 112 and 114, respectively, by appropriate methods such as additive manufacturing or laser cladding thus ensuring all fuel must pass through the permeable barrier 116 only. Ring-shaped permeable barrier 116 is configured and adapted to provide a controlled resistance to fuel flow through fuel circuit 110 to annular distributed fuel outlet 120. Ring-shaped permeable barrier 116 is a flow distributor body, e.g. a sintered metal flow distributor body. Ring-shaped permeable barrier 116 can be formed from a variety of other suitable materials, such as plastic, composite materials, or the like.

As shown in FIG. 6, the permeability of a sintered metal flow distributor body is determined by pore size and void fraction. The pressure drop (ΔP) across a radial thickness (t) of the sintered metal flow distributor body 116 can have a relatively linear relationship with mass flow rate (ṁ), as the fuel mass flow rate increases, the pressure drop across the sintered metal flow distributor body 116 increases, as represented by *Darcy's Law*, equation 1 below, where A is the flow area of the sintered metal flow distributor body 116, v is the kinematic viscosity of the fluid and a is the viscous permeability coefficient of the fluid:

$$\Delta P = \alpha * v * \frac{\dot{m}}{A} * t \qquad \text{(equation 1)}$$

The effective flow area A of the sintered metal flow distributor body 116 can be determined with equation 2, shown below, where D is the smaller diameter of the of the sintered metal flow distributor body 116, and where h is the thickness of the distributor in the direction normal to the flow:

$$A = \pi * D * h \qquad \text{(equation 2)}$$

As already stated, pressure drop for conventional-style fuel distributors is parabolic with mass flow rate. As such, the spin features of the fuel distributor of a conventional nozzle would have to be enlarged to reduce the pressure required at the max flow rate, thereby reducing the pressure drop available at low flow for atomization.

As shown in FIGS. 4-6, ring-shaped permeable barrier 116 has an outer diameter inlet 118 and an inner diameter outlet 120. In some embodiments, inner diameter outlet 120 includes a beveled surface 122 which allows for a fluid lip at the inner diameter outlet 120 to intermix with air from inner and outer fluid circuits 106 and 108. Beveled surface 122 is positioned such that it diverges from longitudinal axis A in the downstream direction. Ring-shaped permeable barrier 116 is configured and adapted to resist flow causing the fluid to completely fill the distribution channel 124 (e.g. the portion of annular fuel circuit 110 not filled with permeable barrier 116) before significantly flowing out of the exit annulus. Fluid, e.g. fuel, is then uniformly distributed around the entire annular diameter at much lower flow than possible in conventional spin chambers of the same diameter. The effusive flow is then exposed to high velocity air which shears the film from the surface of the distributor 110, and accelerates it to simultaneously produce very fine atomization and a rapid level of mixing with the air. In some embodiments, ring-shaped permeable barrier 116 is produced by additive manufacturing, such as powder bed processes, e.g. sintering, or laser cladding, or three-dimensional printing, e.g. laying down thin layers of heated material on top of each other to form the 3D object, cold spray deposition. However, those skilled in the art will readily appreciate that a variety of suitable manufacturing methods can be utilized to generate barrier 116.

Those skilled in the art will readily appreciate that, while embodiments shown and described have the first and second fluid circuits and the fuel circuit spaced apart radially and axially with a radial flow direction, some embodiments can include geometry where fluid in the air circuits and/or fluid circuits flow primarily axially flowing axially or even to conical geometries with the flow flowing both axially and radially. There is an inner location relative to the swirling flow axis and an outer non swirling location which confines the swirling flow but this must not imply a strictly radial geometry.

The methods and systems of the present disclosure, as described above and shown in the drawings, provide for improved and more uniform fuel distribution in annular fuel distributors for air blast fuel nozzles in gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fluid nozzle comprising:
   a first fluid circuit;
   a second fluid circuit spaced apart from the first fluid circuit;
   a fuel circuit defined between the first and second fluid circuits and between a first fuel circuit wall and a second fuel circuit wall; and
   a ring-shaped permeable barrier that forms a complete annulus between the first and second fuel circuit walls, wherein the ring-shaped permeable barrier is configured and adapted to provide a controlled resistance to fuel flow, and wherein the first and second fuel circuit walls each define at least a portion of the boundary of the fuel circuit upstream from the ring-shaped permeable barrier.

2. The fluid nozzle as recited in claim 1, wherein the ring-shaped permeable barrier includes a sintered metal distributor body.

3. The fluid nozzle as recited in claim 1, wherein the ring-shaped permeable barrier has an outer diameter inlet and an inner diameter outlet, wherein the inner diameter outlet includes a beveled surface.

4. The fluid nozzle as recited in claim 1, wherein the ring-shaped permeable barrier is produced by additive manufacturing.

5. The fluid nozzle as recited in claim 1, wherein at least one of the first or second fluid circuits is a swirling air circuit.

6. The fluid nozzle as recited in claim 1, wherein at least one of the first or second fluid circuits is a non-swirling air circuit.

7. The fluid nozzle as recited in claim 1, wherein the first fluid circuit is defined between a first annular swirler shell and second annular swirler shell.

8. The fluid nozzle as recited in claim 1, further comprising a fuel inlet in fluid communication with the fuel circuit.

9. A fuel distributor comprising:
   a first fuel circuit wall;
   a second fuel circuit wall spaced apart from the first fuel circuit wall, wherein a fuel circuit is defined between the first and second fuel circuit walls; and
   a ring-shaped permeable barrier that forms a complete annulus between the first and second fuel circuit walls, wherein the ring-shaped permeable barrier is configured and adapted to provide a controlled resistance to fuel flow in the fuel circuit, and wherein the first and second fuel circuit walls each define at least a portion of the boundary of the fuel circuit upstream from the ring-shaped permeable barrier.

10. The fuel distributor as recited in claim 9, wherein the ring-shaped permeable barrier includes a sintered metal distributor body.

11. The fuel distributor as recited in claim 9, wherein the ring-shaped permeable barrier has an outer diameter inlet and an inner diameter outlet, wherein the inner diameter outlet includes a beveled surface.

12. The fuel distributor as recited in claim 9, wherein the ring-shaped permeable barrier is produced by additive manufacturing.

13. The fuel distributor as recited in claim 9, further comprising a fuel inlet in fluid communication with the fuel circuit.

14. A combustion assembly comprising:
   a combustor housing;
   a combustor dome positioned at an upstream end of the combustor housing; and
   a fluid nozzle positioned adjacent to the combustor dome, the fluid nozzle including:
      a first fluid circuit;
      a second fluid circuit spaced apart from the first fluid circuit;
      a fuel circuit defined between the first and second fluid circuits and between a first fuel circuit wall and a second fuel circuit wall; and
      a ring-shaped permeable barrier, that forms a complete annulus between the first and second fluid circuit walls, wherein the ring-shaped permeable barrier is configured and adapted to provide a controlled resistance to fluid flow, and wherein the first and second fuel circuit walls each define at least a portion of the boundary of the fuel circuit upstream from the ring-shaped permeable barrier.

15. The combustion assembly as recited in claim 14, wherein the ring-shaped permeable barrier includes a sintered metal flow distributor body.

16. The combustion assembly as recited in claim 14, wherein the ring-shaped permeable barrier has an outer diameter inlet and an inner diameter outlet, wherein the inner diameter outlet includes a beveled surface.

17. The combustion assembly as recited in claim 14, wherein the ring-shaped permeable barrier is produced by additive manufacturing.

18. The combustion assembly as recited in claim 14, wherein the first fluid circuit is a swirling air circuit.

19. The combustion assembly as recited in claim 14, wherein the second fluid circuit is a non-swirling air circuit.

20. The combustion assembly as recited in claim 14, wherein the first fluid circuit is defined between a first annular swirler shell and second annular swirler shell.

* * * * *